United States Patent
He et al.

(10) Patent No.: US 11,659,638 B2
(45) Date of Patent: May 23, 2023

(54) LED MATRIX DRIVER TO REDUCE BRIGHT COUPLING

(71) Applicant: TEXAS INSTRUMENTS INCORPORATED, Dallas, TX (US)

(72) Inventors: Yan He, Shanghai (CN); Yang Wang, Shanghai (CN); Haibin Shao, Shanghai (CN); Shang Ding, Shanghai (CN); Wei Xu, Suzhou (CN); Qingjie Ma, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/463,239

(22) Filed: Aug. 31, 2021

(65) Prior Publication Data
US 2023/0067472 A1    Mar. 2, 2023

(51) Int. Cl.
*H05B 45/325* (2020.01)
*H05B 45/34* (2020.01)
*G05B 23/02* (2006.01)
*G09G 3/32* (2016.01)

(52) U.S. Cl.
CPC ....... *H05B 45/325* (2020.01); *G05B 23/0218* (2013.01); *G09G 3/32* (2013.01); *H05B 45/34* (2020.01); *G09G 2310/0267* (2013.01); *G09G 2320/0219* (2013.01)

(58) Field of Classification Search
CPC ............. G09G 2320/0219; G09G 3/32; G09G 2310/0267; H05B 45/325; H05B 45/34; G05B 23/0218
See application file for complete search history.

(56) References Cited

U.S. PATENT DOCUMENTS

| | | | |
|---|---|---|---|
| 11,049,450 B2* | 6/2021 | Han | G09G 3/3233 |
| 2007/0257645 A1* | 11/2007 | Nishino | H02M 1/32 |
| | | | 323/276 |
| 2012/0274233 A1* | 11/2012 | Chen | H05B 45/50 |
| | | | 315/294 |
| 2017/0221417 A1* | 8/2017 | Jung | G09G 3/3258 |

FOREIGN PATENT DOCUMENTS

| | | |
|---|---|---|
| CN | 208 570 071 U | 3/2019 |
| JP | 2002 244616 A | 8/2002 |
| JP | 2003 208125 A | 7/2003 |

OTHER PUBLICATIONS

Notification of Transmittal of the International Search Report and the Written Opinion of the International Searching Authority, or the Declaration; PCT/US2022/041869; dated Dec. 15, 2022; 13 pages.

* cited by examiner

*Primary Examiner* — Muhammad N Edun
(74) *Attorney, Agent, or Firm* — Ray A. King; Frank D. Cimino (57) ABSTRACT

A light emitting diode (LED) matrix driver includes a scan line switch coupled to a scan line of an LED matrix and adapted to be coupled to a signal ground; a first voltage clamp coupled to the scan line switch and the scan line; and a second voltage clamp coupled to the scan line.

17 Claims, 4 Drawing Sheets

LED MATRIX DRIVER TO REDUCE BRIGHT COUPLING

BACKGROUND

A light emitting diode (LED) is a type of diode that emits light when it is forward biased. Depending on its composition, the LED may emit a visible color of light. Different types of LEDs emit different colors of light, such as red, green, and blue. Responsive to a voltage source providing a voltage to the LED that is equal to or greater than a forward voltage (VF) of the LED, the LED emits light.

Pulse width modulation (PWM) techniques are useful to adjust the observed brightness of the LED by providing a modulated voltage to the LED. Responsive to the PWM signal being high, the LED is on, and responsive to the PWM signal being low, the LED is off. Changing the duty cycle of the PWM results in a change in observed brightness of the LED. The frequency of the PWM is selected to be higher than a frequency observable by the human eye. An array of LEDs may be implemented in a display of an electronic device, such as calculators, televisions, and other devices with a display. The array of LEDs in a display may form a matrix of rows and columns.

SUMMARY

In some examples, a LED matrix driver comprises a scan line switch coupled to a scan line of an LED matrix and adapted to be coupled to a signal ground; a first voltage clamp coupled to the scan line switch and the scan line; and a second voltage clamp coupled to the scan line.

In some examples, a LED matrix driver comprises a scan line switch coupled to a scan line of an LED matrix and adapted to be coupled to a signal ground, the scan line switch configured to couple the signal ground to the scan line; a first voltage clamp coupled to the scan line switch and the scan line, the first voltage clamp configured to clamp a voltage of the scan line below a first reference voltage; and a second voltage clamp coupled to the scan line and configured to clamp the voltage of the scan line above a second reference voltage.

In some examples, a system comprises an image source configured to output display data; an LED matrix including one or more LED arrays; and an LED matrix driver coupled to the image source and the LED matrix, the LED matrix including a scan line switch coupled to a scan line of the LED matrix and adapted to be coupled to a signal ground source, the scan line switch configured to couple the signal ground to the scan line; a first voltage clamp coupled to the scan line switch and the scan line and configured to clamp a voltage of the scan line below a first reference voltage; and a second voltage clamp coupled to the scan line and configured to clamp the voltage of the scan line above a second reference voltage.

DETAILED DESCRIPTION

As described above, the brightness level of an LED may be controlled using a PWM signal. The PWM signal provides voltage at a high level and a low level. The low level of the PWM signal is usually zero volts, and the high level of the PWM signal is usually determined based on the LED characteristics. The high level is usually set so the difference between the high level, which is applied to an anode of an LED, and ground (or other suitable voltage), which is applied to the cathode of the LED, is greater than a forward voltage of the LED. The PWM signal includes a number of cycles per a unit of time, usually referred to as a frequency. The frequency of the PWM signal is selected such that changes of the LED from off to on or on to off are not observable to the human eye. Usually, the frequency to avoid detection by the human eye is at least 50 cycles per minute, or 50 Hertz (Hz).

Each cycle of the PWM signal includes a period of time during which the high level is applied and a period of time during which the low level is applied. The proportion of the cycle time that the PWM signal is high is referred to as the duty cycle. A shorter duty cycle of the PWM signal reduces the observed brightness of the LED. For example, when the frequency of the PWM signal is above 50 Hz and the duty cycle is 50%, to the human eye the LED will appear dimmer than a PWM signal with a duty cycle of 100%. Sometimes the duty cycle of an LED may be shorter or longer than the duty cycle of an adjacent LED, such as when shading of an image occurs.

In some cases, an LED matrix driver implements a PWM scheme to control LEDs. The LED matrix driver is configured to drive an LED matrix that includes multiple LEDs arranged in rows and columns. The LED driver drives individual LEDs in the LED matrix by selectively turning on horizontal control lines referred to as scan lines and vertical control lines referred to as channels. The PWM scheme includes turning on all channels in the matrix at the same time. Depending on duty cycles, the channels turn off at different times. Scan lines are selected one at a time. In some cases, selecting a scan line provides a ground or current sink for the current source that is applied to each of the selected channels. In some other cases, selecting a scan line connects a current source the scan line and selecting a channel provides a ground or current sink for the current source. Thus, only LEDs coupled to a selected scan line and a turned on channel illuminate.

LEDs in proximity to one another in an LED matrix may experience bright coupling. Bright coupling occurs when an LED coupled to a selected scan line and an energized channel causes an adjacent LED coupled to a de-energized channel to emit light visible to the human eye. Thus, an area of the display that should be dark will appear brighter due to bright coupling. The bright coupling may be due in part to a parasitic capacitance formed between the adjacent LEDs in the matrix. Parasitic capacitance is an unwanted capacitance between conductors of a circuit. The proximity of the LEDs contributes to the parasitic capacitance between the LEDs.

As the proximity of the LEDs decreases and the quantity of the LEDs increases, the parasitic capacitance of the LED matrix increases. The parasitic capacitance contributes to a voltage applied to LEDs, causing the LEDs to appear brighter than expected due to bright coupling.

Described herein are various examples of an LED matrix driver to mitigate bright coupling. To reduce the effects of bright coupling, a clamp is coupled to the scan lines in an LED matrix. Some conventional approaches include a clamp to keep a scan line voltage above a reference voltage. According to examples herein, a second clamp is added to the scan line to clamp the scan line voltage not higher than a second reference voltage. The second reference voltage is selected to be less than the sum of the voltage required to turn on the transistors of the first clamp (Vclamp1) and the VF of the LEDs in the LED matrix. Accordingly, the two clamps maintain the scan line voltage of non-selected scan lines between the two reference voltages. Responsive to the selection of a scan row, LEDs adjacent to the selected scan row experience a voltage increase due to parasitic capacitance. However, as the voltage at the second clamp reaches the second reference voltage (less than Vclamp1+VF), the second clamp sinks current, preventing non-selected LEDs from emitting observable light and eliminating the unwanted illumination due to bright coupling.

Figure 1A:
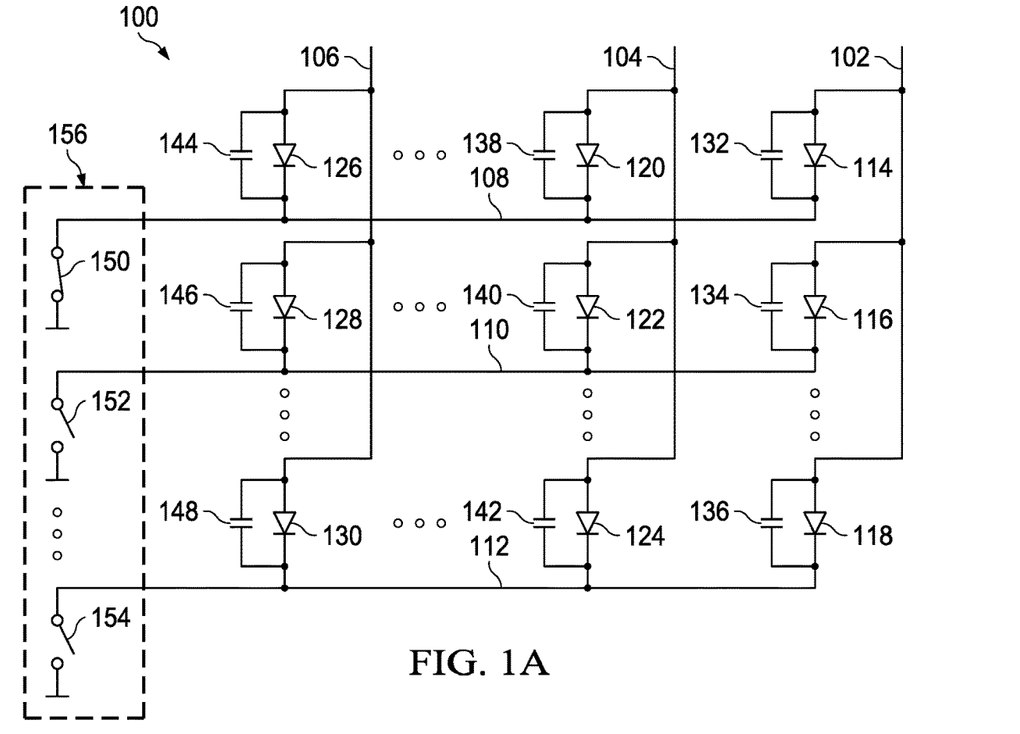
FIG. 1A is a circuit schematic diagram of a conventional LED matrix.

FIG. 1A is an example of a conventional LED matrix 100. The example LED matrix 100 includes multiple LEDs arranged in rows and columns. Specifically, the LED matrix 100 includes channels 102, 104, and 106, and the LED matrix 100 also includes scan lines 108, 110, and 112. The LED matrix 100 may include x channels, although only three channels 102, 104, and 106 are expressly shown in FIG. 1A. Similarly, the LED matrix 100 may include n scan lines, although only three scan lines 108, 110, and 112 are expressly shown in FIG. 1A. As described below, voltages may be selectively applied to the channels 102, 104, and 106 and scan lines 108, 110, and 112 may be selectively connected to ground to provide voltages across different LEDs in the LED matrix 100 so as to forward-bias certain LEDs.

The LED matrix 100 may include LEDs (also referred to herein as "diodes") 114, 116, 118, 120, 122, 124, 126, 128, and 130. The LED matrix 100 may include more LEDs that are not expressly shown (e.g., n * x LEDs). The anodes of the LEDs 114, 116, and 118 are coupled to channel 102. The anodes of the LEDs 120, 122, and 124 are coupled to channel 104. The anodes of the LEDs 126, 128, and 130 are coupled to channel 106. Further, the cathodes of the LEDs 114, 120, and 126 are coupled to the scan line 108. The cathodes of the LEDs 116, 122, and 128 are coupled to the scan line 110. The cathodes of the LEDs 118, 124, and 130 are coupled to the scan line 112.

Each of the LEDs in the LED matrix 100 may be associated with a parasitic capacitance. For example, the LED 114 may be associated with a parasitic capacitance 132; the LED 116 may be associated with a parasitic capacitance 134; the LED 118 may be associated with a parasitic capacitance 136; the LED 120 may be associated with a parasitic capacitance 138; the LED 122 may be associated with a parasitic capacitance 140; the LED 124 may be associated with a parasitic capacitance 142; the LED 126 may be associated with a parasitic capacitance 144; the LED 128 may be associated with a parasitic capacitance 146; and the LED 130 may be associated with a parasitic capacitance 148. The parasitic capacitances shown in FIG. 1A are not physical capacitors (e.g., plates abutting opposing sides of a dielectric layer) but rather exist due to the PN junctions of LEDs in the LED matrix 100, potentially causing the bright coupling challenges described above.

The scan lines 108, 110, and 112 include switches 150, 152, and 154 (e.g., field effect transistors (FETs)), respectively, and these switches are components of an LED matrix driver 156. Although only three switches are shown, in examples, each of the scan lines has its own switch. Responsive to the switch 150 being closed, the scan line 108 is selected, and responsive to the switch 150 being open, the scan line 108 is non-selected. The switch 152 operates similarly with reference to scan line 110, and the switch 154 operates similarly with reference to scan line 112. By selectively controlling the channels 102, 104, and 106 and the scan lines 108, 110, and 112, each of the LEDs in the LED matrix 100 may be individually controlled.

Figure 1B:
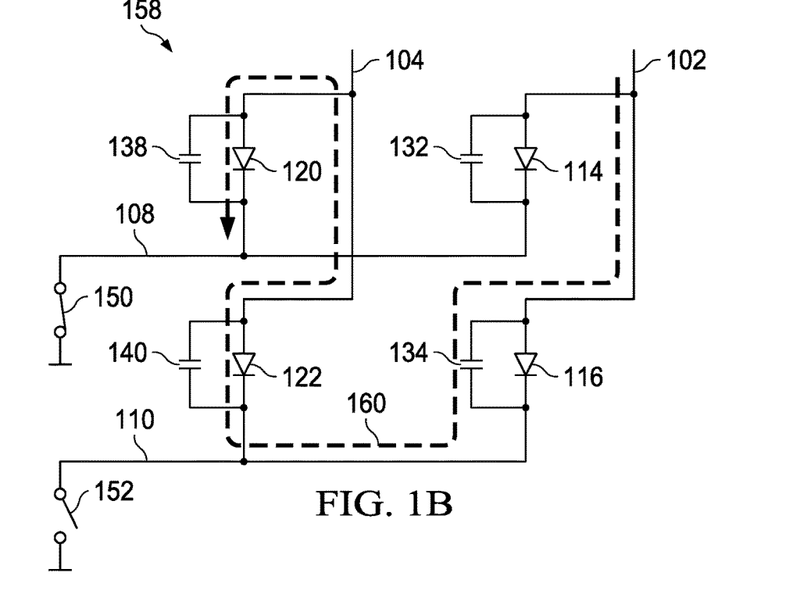
FIG. 1B is a circuit schematic diagram of a portion of a conventional LED matrix.

FIG. 1B is an example of a representative portion 158 of conventional LED matrix 100. Portion 158 includes diodes 114, 116, 120, and 122. Each diode 114, 116, 120, and 122 has a parasitic capacitance 132, 134, 138, and 140, respectively. Scan line 108 is selected because switch 150 is closed. Scan line 110 is non-selected because switch 152 is open. As described above, in examples, all channels turn on at the beginning of each cycle of a PWM scheme. A channel turns off based on a duty cycle of an LED coupled to the channel and the selected scan row. Thus, the channels may turn off at different times during a cycle of a PWM scheme. In a first example, channel 104 turns off while channel 102 is on. Current from channel 102 illuminates LED 120 even after channel 104 turns off. The LED 120 continues to illuminate after channel 104 is turned off due to current in channel 104 as a result of the parasitic capacitances 132, 134, 136, and 138. Specifically, during the time current is applied to channels 102 and 104, the parasitic capacitances 132, 134, 136, and 138 are charged. Responsive to the current no longer being applied to channel 104, the charge carried by the parasitic capacitances 132, 134, 136, and 138 continues to provide a current through channel 104, which dissipates over time. Consequently, the LED 120 continues to illuminate until the current provided to channel 104 by the parasitic capacitances 132, 134, 136, and 138 drops so as to cause the voltage provided to LED 120 to drop below the VF of LED 120. Responsive to scan line 108 being selected, a return path to ground is provided for the channels 102 and 104. A portion of current applied to channel 102 follows path 160 to ground through scan line 108 and switch 150. In this example, current applied to channel 102 follows path 160 through LED 114, through parasitic capacitance 134, through scan line 110, through parasitic capacitance 140, and through LED 120. In this case, the parasitic capacitance of path 160 is approximately the capacitance of parasitic capacitance 138 (Cj) plus the series capacitance of parasitic capacitances 134 and 140 (.5Cj). The parasitic capacitances 134, 138, and 140 are estimates and may vary based on a number of factors, such as the number of channels and scan lines in the LED matrix 100 and the pitch between LEDs. In a second example, channel 104 and channel 102 turn off simultaneously. The voltage on channel 104 drops faster relative to the first example because the parasitic capacitance 138 at LED 120 in this case is only Cj and there is no contribution from channel 102 because channel 102 is also turned off. As the number of scan lines and number of channels in an LED matrix increase, the value of the parasitic capacitance in the LED matrix increases.

One approach to reduce bright coupling in the conventional LED matrix 100 is to reduce the absolute value of voltage on channel 104 responsive to the channel 104 being turned off. For example, voltage on channel 104 should be held to as low a value as possible while exceeding VF for the diodes. Reducing voltage on channel 104 results in a lower stored voltage in the parasitic capacitance 138 and decreases the possibility of bright coupling. The clamps described above are useful to achieve such voltage regulation. These clamps are described with reference to the drawings below.

Figure 2:
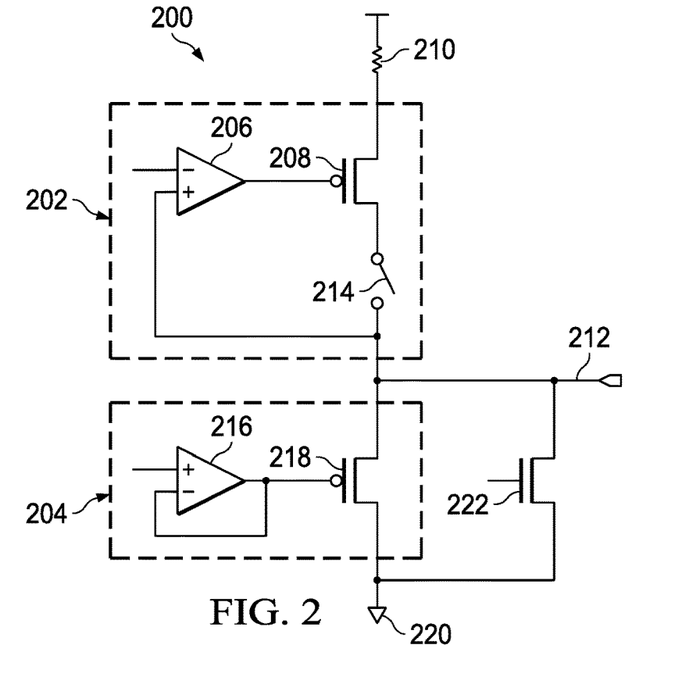
FIG. 2 is a circuit schematic diagram of an LED matrix driver in accordance with various examples.

FIG. 2 is a circuit schematic diagram of a circuit 200 for reducing bright coupling in an LED matrix, in accordance with various examples. Circuit 200 may be included in an LED matrix driver. The circuit 200 includes a low voltage clamp 202 and a high voltage clamp 204. The low voltage clamp 202 includes an operational amplifier (op-amp) 206 and transistor 208. Transistor 208 is a positive-channel metal oxide semiconductor (PMOS). The inverting input of the op-amp 206 is coupled to a low reference voltage (Vref_L) source (not pictured). The non-inverting input of the op-amp 206 is coupled to the source of the transistor 208. The output of op-amp 206 is coupled to the gate of transistor 208. The drain of transistor 208 is coupled to resistor 210. The source of transistor 208 is coupled to scan line 212 through switch 214. The high voltage clamp 204 includes an op-amp 216 and transistor 218. Transistor 218 is a PMOS. The inverting input of the op-amp 216 is coupled to the output of the op-amp 216. The non-inverting input of the op-amp 216 is coupled to a high reference voltage (Vref_H) source (not pictured). The output of op-amp 216 is also coupled to the gate of transistor 218. The drain of transistor 218 is coupled to ground 220. The source of transistor 218 is coupled to scan line 212.

The circuit 200 further includes a scan line switch 222 coupled to scan line 212. The scan line switch 222 is a negative-channel metal oxide semiconductor (NMOS) transistor. The drain of the scan line switch 222 is coupled to the scan line 212. The source of the scan line switch 222 is coupled to the signal ground 220. The gate of the scan line switch 222 may be coupled to a controller (not pictured). The controller may provide a control signal to the gate of the scan line switch 222 to select or non-select the scan line 212. Responsive to the scan line switch 222 closing, the selected line (scan line 212) is connected to the signal ground 220. Low voltage clamp 202, high voltage clamp 204 and scan line switch 222 may be part of an LED matrix driver. Each scan line controlled by the LED matrix driver may be coupled to a respective set of low voltage clamps and high voltage clamps. While clamps 202 and 204 include an op-amp and transistor, other clamping circuit configurations or devices may be useful to clamp a high reference voltage and low reference voltage provided to scan lines via an LED matrix driver.

Scan line switch 222 controls whether the scan line 212 is selected or not selected. Responsive to the scan line 212 being selected, a circuit is completed and ground is provided to LEDs coupled to the scan line 212. Switch 214 is open when scan line 212 is selected. Opening switch 214 removes low voltage clamp 202 from the circuit resulting in voltage on scan line 212 dropping to zero creating a current sink for the current applied to the channels connected to the scan line 212. While the scan line 212 is not selected, voltage on the scan line 212 is floating (e.g., no ground) and ground is not provided to the LEDs coupled to the scan line 212. Low voltage clamp 202 clamps the scan line voltage of not selected scan lines above a low reference voltage (Vref_L). Switch 214 is closed when the scan line 212 is not selected. While switch 214 is closed, scan line 212 is maintained at a voltage equal to Vref_L. A difference between voltage applied to channels and Vref_L is less than the VF of the LEDs. Thus, LEDs on non-selected scan rows do not illuminate.

High voltage clamp 204 clamps the scan line voltage not higher than a sum of a high reference voltage (Vref_H) and a turn on voltage (Vgs) of the transistor 218 in the high voltage clamp 204. The combination of low voltage clamp 202 and high voltage clamp 204 clamps the scan line voltage between Vref_L and Vref_H+Vgs. Such clamping reduces the likelihood of observable bright coupling. The clamps do not remove parasitic capacitance from an LED matrix (e.g., LED matrix 100), but reduce the charge in the parasitic capacitance relative to a circuit that does not have a high voltage clamp.

Circuit 200 may operate as follows. No voltage is applied to the gate of scan line switch 222. Thus, scan line 212 is not selected. Switch 214 will be closed. Vref_L is provided at the inverting input of op-amp 206. The voltage of scan line 212 is provided at the non-inverting input of op-amp 206. If the voltage on scan line 212 is below Vref_L, a positive voltage is provided from the output of op-amp 206 to the gate of transistor 208. Current flows through transistor 208 to resistor 210 which pulls up the voltage on scan line 212 to Vref_L. Vref_H is provided at the non-inverting input of op-amp 216. Vref_H is provided at the output of op-amp 216 because the output of op-amp 216 is coupled to the inverting input of op-amp 216. If the voltage provided by scan line 212 exceeds Vref_H, the gate to source voltage of transistor 218 becomes positive, and current begins to flow through transistor 218. Thus, voltage on scan line 212 is equal to or less than Vref_H plus Vgs of transistor 218. Consequently, low-voltage clamp 202 and high-voltage clamp 204 maintain voltage on non-selected scan lines between Vref_L and Vref_H+Vgs.

Figure 3:
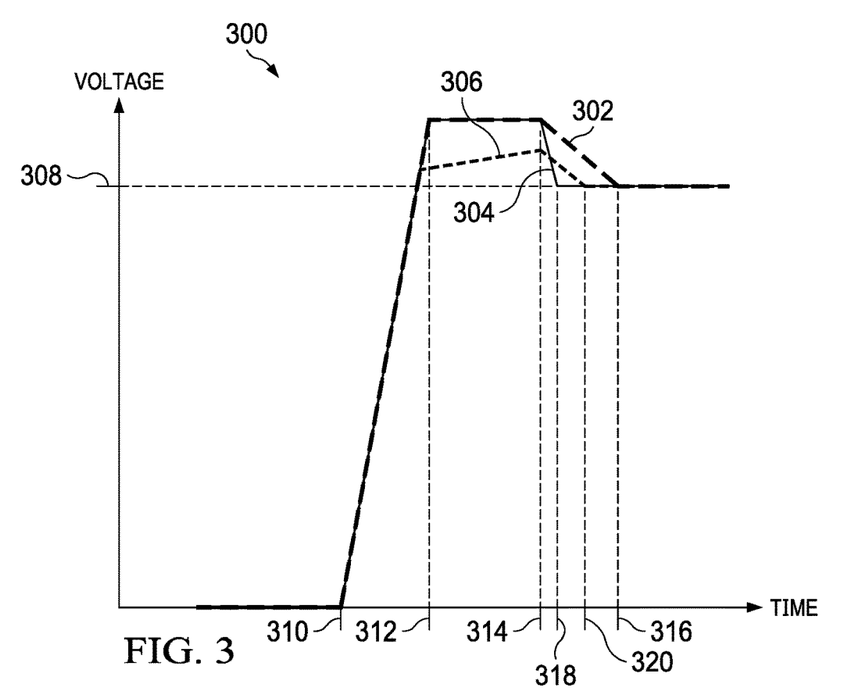
FIG. 3 is a plot of voltage as a function of time for an LED matrix in accordance with various examples.

FIG. 3 is an example of a plot 300 of voltage as a function of time for a channel of an LED matrix. The plot 300 is described with reference to the components of FIG. 1B and FIG. 2. The plot 300 includes waveforms 302, 304, and 306. Waveform 302 represents the voltage on channel 104 according to the first example described above with reference to FIG. 1B. Waveform 304 represents the voltage on channel 104 according to the second example described above with reference to FIG. 1B. Waveform 306 represents the voltage on channel 104 with the solution described with reference to FIG. 2. As described below, the waveforms 302, 304, and 306 demonstrate the efficacy of the examples described herein (e.g., of the circuit 200) in reducing bright coupling by rapidly reducing the voltage on channel 104 in the situation where channels 102 and 104 are both on and channel 104 is subsequently turned off while channel 102 remains on.

The waveforms 302, 304, and 306 overlap with each other except as shown. Voltage 308 is the voltage at which the diodes 114 and 120 begin illuminating, meaning the voltage 308 is the VF for diodes 114 and 120. At time 310, channel 102 and channel 104 are turned on. At time 312, both diode 120 and diode 114 are illuminating. With respect to waveform 302 at time 314, channel 104 turns off while channel 102 remains on. From time 314 to time 316, as waveform 302 shows, the parasitic capacitance discharges and bright coupling occurs causing diode 120 to illuminate. At time 316, as waveform 302 shows, the voltage on channel 104 falls to voltage 308 (VF), diode 120 turns off, and the bright coupling ends. Waveform 304 overlaps with waveform 302 from time 310 to time 314. With respect to waveform 304, at time 314, channel 104 and channel 102 turn off From time 314 to time 318, as waveform 304 shows, the parasitic capacitance discharges quickly such that bright coupling that is visible to the human eye does not occur. Waveform 306 overlaps with waveform 302 except for the period extending from just prior to time 312 to time 316. From just prior to time 312 to time 314 waveform 306 rises in voltage. The voltage is less than the voltage during the same period with respect to waveforms 302 and 306 due to the high voltage clamp on non-selected scan lines. This is described below with regard to FIG. 4. With respect to waveform 306 at time 314, channel 104 turns off while channel 102 remains on. From time 314 to time 320, as waveform 306 shows, the parasitic capacitance discharges quickly (relative to waveform 302, which is an example of LED matrix behavior without the high voltage clamp described herein) such that bright coupling that is visible to the human eye does not occur. The rapid discharge that waveform 306 exhibits is in part due to voltage on scan line 110 being clamped at Vref_H+Vgs, as described above.

Figure 4:
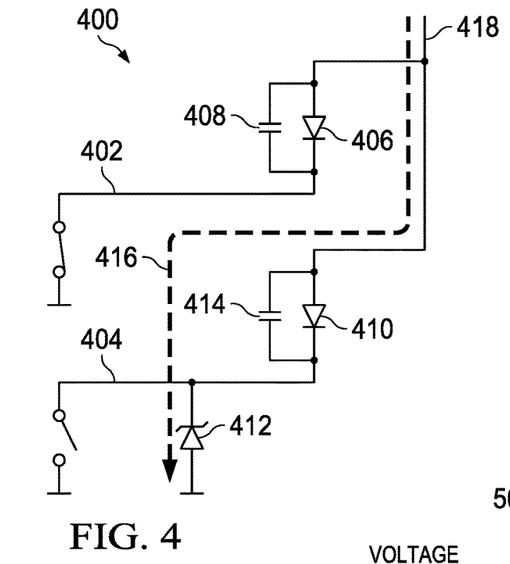
FIG. 4 is a circuit schematic diagram of an LED matrix in accordance with various examples.
Figure 5:
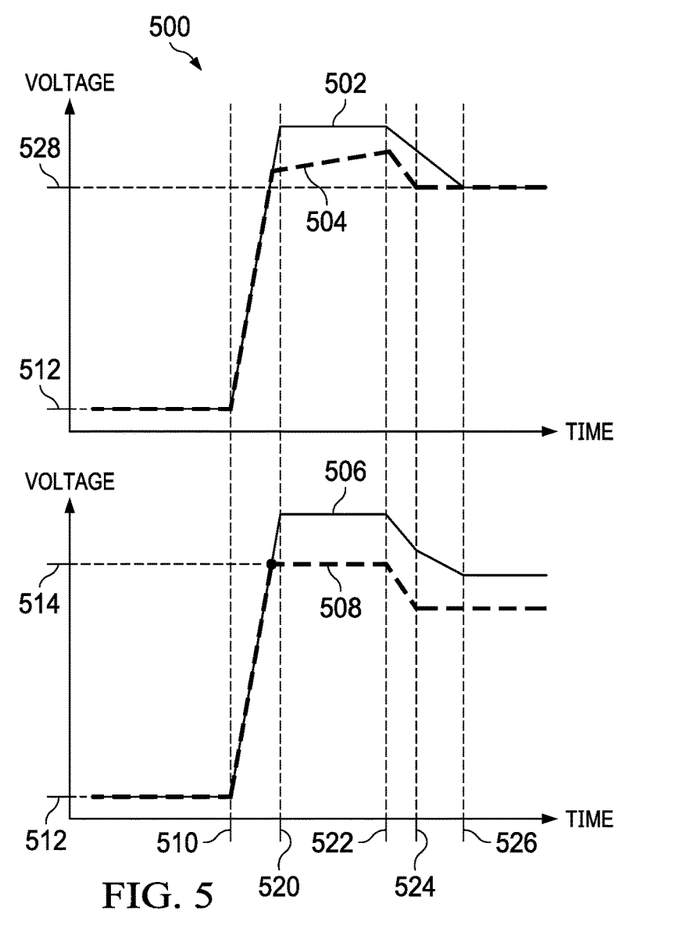
FIG. 5 is a plot of voltage as a function of time in an LED matrix in accordance with various examples.

FIG. 4 is an example of a circuit 400 according to various examples herein. Circuit 400 may be an example portion of an LED matrix and LED matrix driver. Circuit 400 includes scan lines 402 and 404. Scan line 402 is coupled to diode 406. Diode 406 has an associated parasitic capacitance 408. Scan line 404 is coupled to diode 410 and Zener diode 412. Zener diode 412 may behave similarly to high voltage clamp 204. Zener diode 412 may have a breakdown voltage equal to Vref_H+Vgs such that current from scan line 404 is sunk when the voltage on scan line 404 exceeds Vref_H+Vgs. Diode 410 has an associated parasitic capacitance 414. Path 416 represents current flow based on the Zener diode 412 sinking current from channel 418 when channel 418 is turned on. FIG. 5 is an example of a plot 500 of voltage as a function of time for diodes (e.g., diode 406) coupled to a selected scan line (e.g., scan line 402) and voltage as a function of time for diodes (e.g., diode 410) coupled to a non-selected scan line (e.g., scan line 404). Waveform 502 represents voltage at an anode of an LED (e.g., LED 114) coupled to a selected scan line (e.g., scan line 108) without a high voltage clamp. Waveform 504 represents voltage at an anode of LED 406 coupled to a selected scan line 402 in a circuit with a high voltage clamp (e.g., Zener diode 412). Waveform 506 represents a scan line voltage of a non-selected scan line (e.g., scan line 110) without a high voltage clamp. Waveform 508 represents a scan line voltage of a non-selected scan line 404 in a circuit with a high voltage clamp (e.g., Zener diode 412). Prior to time 510, scan line 402 is connected to ground and scan line 404 is charged to Vref_L 512. At time 510, a channel coupled to LEDs 406 and 410 is turned on and voltage at the LED 406 anode increases. Non-selected scan line 404 voltage rises from Vref_L 512 due to bright coupling. Responsive to the voltage reaching Vref_H+Vgs, 514 the Zener diode 412 sinks current from a constant current source (not pictured) coupled to channel 418. Sinking the current slows down the rate at which voltage is applied to the anode of diode 406 as shown by waveform 504 between time 520 and 522. At time 522, channel 418 is turned off and voltage decreases to VF 528 of the diodes 406 and 410. While the Zener diode 412 is in breakdown (e.g., clamping the voltage on scan line 404), a lower anode voltage is provided at the LEDs and thus the turn off time is faster for the LEDs. For example, the turn off time for waveform 504 is from time 522 to time 524, which is shorter than the turn-off time for waveform 502, time 522 to time 526. Faster turn off time reduces the brightness difference to a point not visible to the human eye. Thus, bright coupling is reduced in the circuit 400 with a high voltage clamp.

Figure 6:
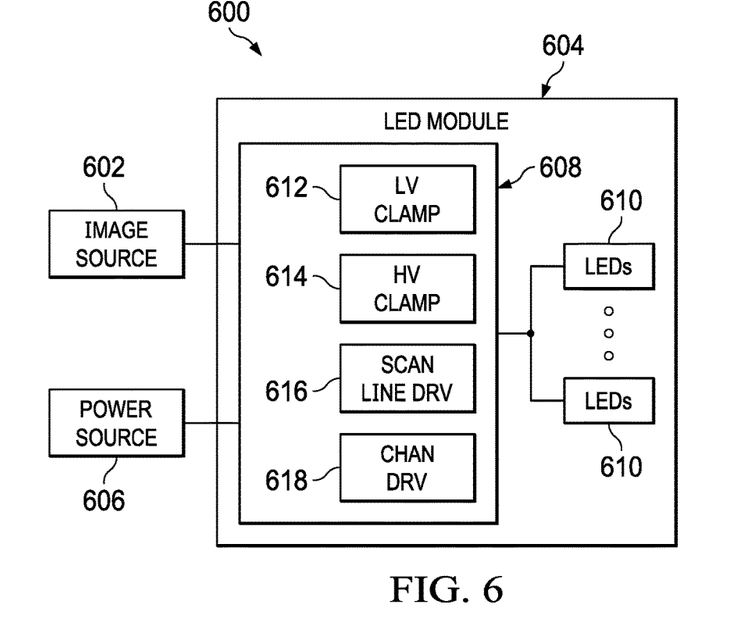
FIG. 6 is a block diagram of a system for LED display in accordance with various examples.

FIG. 6 is an example of a system 600 for image display. The system 600 includes an image source 602, an LED module 604 coupled to the image source 602, and a power source 606 coupled to the LED module 604. The LED module 604 may be one or more printed circuit boards. The LED module 604 includes an LED matrix driver 608 and one or more LED arrays 610. The LED arrays 610 may be configured as an LED matrix for display of an image. The LED arrays 610 may include red, green, and blue (RGB) LEDs for displaying an image from the image source 602. Depending on the size and resolution of the display, more or fewer LED arrays 610 may be present on LED module 604.

Depending on the number of LED arrays 610 and the capabilities of LED matrix driver 608, additional LED matrix drivers 608 may be provided in the LED module 604 to control LED arrays 610. The LED matrix driver 608 includes a low voltage clamp 612, a high voltage clamp 614, scan line drivers 616, and channel drivers 618. The LED matrix driver 608 may include additional components not pictured, such as, a processor, memory, brightness control circuits, etc. Channel drivers 618 may include circuitry configured to select, e.g., turn on, channels in an LED matrix formed by LED arrays 610. Scan line drivers 616 may include circuitry configured to select, e.g., turn on, selected scan lines in an LED matrix formed by LED arrays 610. At a location where a selected channel intersects a selected scan line, an LED, or RGB LEDs, are illuminated. High voltage clamp 614 is a clamp circuit (sometimes referred to as a damper or clamping circuit) configured to clamp non-selected scan lines below a reference voltage, such as Vref_H+Vgs. Low voltage clamp 612 is a clamp circuit configured to clamp scan line voltage of non-selected scan lines above a reference voltage, such as Vref_L. The system 600 may include other components for display of an image. The image source 602 may be a computer, calculator, mobile device, or any other device capable of providing an electronic image for display. The image source 602 transmits data of the image to the LED matrix driver 608 for display on LED arrays 610. Power source 606 may be an external power supply or may be provided by image source 602. Power source 606 may provide reference voltages, e.g., Vref_L and Vref_H.

The reference voltages (e.g., Vref_L, Vref_H) of both the high voltage clamp 614 and low voltage clamp 612 may be adjustable. The reference voltages may be adjusted based on characteristics of the LED arrays 610, the LED matrix size, parasitic capacitance of LEDs in the LED arrays 610, or other factors. The adjustable reference voltages may be controlled by registers in the LED matrix driver 608 or by some other control device.

Figure 7:
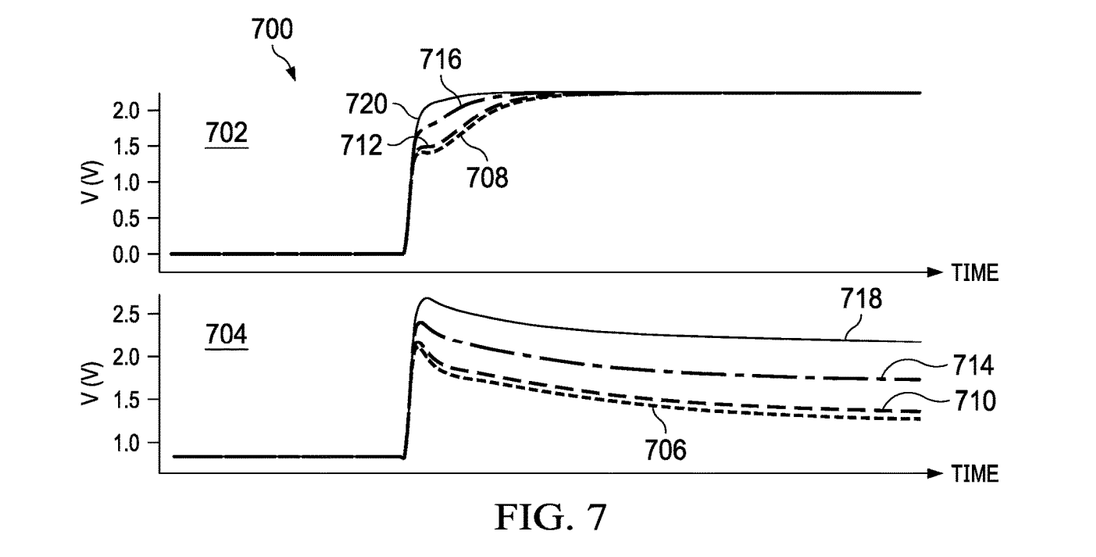
FIG. 7 is a plot of voltage as a function of time in an LED matrix in accordance with various examples.

FIG. 7 is a pair of plots 702 and 704 of voltage as a function of time for LED anode voltage on a selected scan line and a non-selected scan line. Plot 702 represents LED anode voltage as a function of time of an LED coupled to a selected scan line and a turned on channel with a fixed Vref_L and a varying Vref_H. Plot 704 represents voltage as a function of time for a non-selected scan line with a fixed Vref_L and a varying Vref_H. Waveform 706 corresponds to waveform 708. Waveform 710 corresponds to waveform 712. Waveform 714 corresponds to waveform 716. Waveform 718 corresponds to waveform 720. Each pair of waveforms in plots 702 and 704 represents a different Vref_H value. The LED in this simulation has a VF of approximately 1.9V. Increasing Vref_H decreases the time for the LED anode to reach VF (e.g., 1.9V). Waveforms 718 and 720 result in a faster turn on time for the LED. Thus, Vref_H corresponding to waveforms 718 and 720 may be selected in a high voltage clamp with variable Vref_H.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the term "ground" in the foregoing description includes a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/- 10 percent of the stated value. Modifications are possible in the described examples, and other examples are possible within the scope of the claims.

What is claimed is:

1. A light emitting diode (LED) matrix driver comprising:
   a scan line switch coupled between a scan line terminal and a ground terminal;
   a first voltage clamp coupled to the scan line switch and the scan line terminal, the first voltage clamp including:
   an amplifier having an amplifier output and first and second amplifier inputs,
   wherein the first amplifier input is coupled to a reference voltage terminal; and
   a transistor coupled between the scan line terminal and the ground terminal and having a control terminal, wherein the control terminal is coupled to the second amplifier input and the amplifier output; and
   a second voltage clamp coupled to the scan line terminal.

2. The LED matrix driver of claim 1, wherein the amplifier is a first amplifier, the reference voltage terminal is a first reference voltage terminal, the transistor is a first transistor, the control terminal is a first control terminal, and the second voltage clamp includes:
   a second amplifier having a second amplifier output and third and fourth amplifier inputs, wherein the third amplifier input is coupled to a second reference voltage terminal, and the fourth amplifier input is coupled to the scan line terminal; and
   a second transistor coupled between the scan line terminal and a resistor and having a second control terminal, wherein the second control terminal is coupled to the second amplifier output.

3. The LED matrix driver of claim 2, wherein the scan line switch includes a third transistor coupled between the scan line terminal and the ground terminal and having a third control terminal.

4. The LED matrix driver of claim 3, wherein the first transistor and the second transistor are p-channel field effect transistors (PFETs), and wherein the third transistor is an n-channel field effect transistor (NFET).

5. A light emitting diode (LED) matrix driver comprising:
   a scan line switch coupled between an LED matrix scan line and a ground terminal;
   a first voltage clamp coupled to the scan line switch and the scan line, the first voltage clamp configured to clamp a voltage of the scan line below a first reference voltage, the first voltage clamp including:
   an amplifier having an amplifier output and first and second amplifier inputs,
   wherein the first amplifier input is coupled to a first reference voltage terminal; and
   a transistor coupled between the scan line and the ground terminal and having a control terminal, wherein the control terminal is coupled to the second amplifier input and the amplifier output; and
   a second voltage clamp coupled to the scan line and configured to clamp the voltage of the scan line above a second reference voltage.

6. The LED matrix driver of claim 5, wherein the first voltage clamp is configured to receive the first reference voltage from a power source.

7. The LED matrix driver of claim 6, wherein the second voltage clamp is configured to receive the second reference voltage from the power source.

8. The LED matrix driver of claim 6, wherein the scan line switch is configured to:
   receive a control signal from a controller; and
   provide an electrical connection to the ground terminal responsive to the control signal.

9. The LED matrix driver of claim 5, wherein the amplifier is a first amplifier, the amplifier output is a first amplifier output, the transistor is a first transistor, the control terminal is a first control terminal, and the second voltage clamp includes:
 a second amplifier having a second amplifier output and third and fourth amplifier inputs, wherein the third amplifier input is coupled to a second reference voltage terminal, and the fourth amplifier input is coupled to the scan line; and
 a second transistor coupled between the scan line and a resistor and having a second control terminal, wherein the second control terminal is coupled to the second amplifier output.

10. The LED matrix driver of claim 9, wherein the scan line switch includes a third transistor coupled between the scan line and the ground terminal, and having a third control terminal.

11. A system comprising:
 an image source;
 an LED matrix; and
 an LED matrix driver coupled to the image source and the LED matrix, the LED matrix including:
  a scan line switch coupled between to a scan line of the LED matrix and a ground terminal;
  a first voltage clamp coupled to the scan line switch and the scan line and configured to clamp a voltage of the scan line below a first reference voltage, the first voltage clamp including:
   an amplifier having an amplifier output and first and second amplifier inputs, wherein the first amplifier input is coupled to a first reference voltage terminal; and
  a transistor coupled between the scan line and the ground terminal and having a control terminal, wherein the control terminal is coupled to the second amplifier input and the amplifier output; and
  a second voltage clamp coupled to the scan line and configured to clamp the voltage of the scan line above a second reference voltage.

12. The system of claim 11, further comprising a power source coupled to the first reference voltage terminal, wherein the power source is configured to provide the first reference voltage.

13. The system of claim 12, wherein the power source is configured to provide the second reference voltage.

14. The system of claim 13, wherein the scan line switch is configured to:
 receive a control signal from a controller; and
 provide an electrical connection to the ground terminal responsive to the control signal.

15. The system of claim 11, wherein the second voltage clamp includes:
 a second amplifier having a second amplifier output and third and fourth amplifier inputs, wherein the third amplifier input is coupled to a second reference voltage terminal, and the fourth amplifier input is coupled to the scan line; and
 a second transistor coupled between the scan line and a resistor and having a second control terminal, wherein the second control terminal is coupled to the second amplifier output.

16. The system of claim 15, wherein the scan line switch includes a third transistor coupled between the scan line and the ground terminal, and having a third control terminal.

17. The system of claim 15, wherein the LED matrix includes scan lines including the scan line.

* * * * *